US009654850B2

United States Patent
Aono (10) Patent No.: US 9,654,850 B2
(45) Date of Patent: May 16, 2017

(54) WAVELENGTH MULTIPLEXER, AND METHOD AND PROGRAM FOR IDENTIFYING FAILED PORTION

(71) Applicant: NEC CORPORATION, Tokyo (JP)

(72) Inventor: Yoshiaki Aono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 3 days.

(21) Appl. No.: 14/414,156

(22) PCT Filed: Jul. 11, 2013

(86) PCT No.: PCT/JP2013/069016
§ 371 (c)(1),
(2) Date: Jan. 12, 2015

(87) PCT Pub. No.: WO2014/021075
PCT Pub. Date: Feb. 6, 2014

(65) Prior Publication Data
US 2015/0215687 A1    Jul. 30, 2015

(30) Foreign Application Priority Data

Jul. 31, 2012    (JP) ................................ 2012-169440

(51) Int. Cl.
*H04J 14/00*    (2006.01)
*H04Q 11/00*    (2006.01)
(Continued)

(52) U.S. Cl.
CPC ..... *H04Q 11/0005* (2013.01); *H04B 10/0797* (2013.01); *H04B 10/0799* (2013.01);
(Continued)

(58) Field of Classification Search
CPC ....... H04Q 11/0005; H04Q 2011/0015; H04Q 11/0003
(Continued)

(56) References Cited

U.S. PATENT DOCUMENTS

2002/0097460 A1*  7/2002  Ikoma ................... H04B 10/00
                                                              398/9
2004/0151499 A1    8/2004  Ibukuro et al.
(Continued)

FOREIGN PATENT DOCUMENTS

CN          1492602 A       4/2004
CN        101309123 B       8/2011
(Continued)

OTHER PUBLICATIONS

Kurokawa [JP 2002-033703, English translation].*
(Continued)

*Primary Examiner* — Oommen Jacob
(74) *Attorney, Agent, or Firm* — Sughrue Mion, PLLC (57) ABSTRACT

To provide a wavelength multiplexing device and the like that can effectively identify whether impairment occurs at a location before or after a separation and switching module, a wavelength multiplexing device (100) is connected to one or more optical fiber line systems and to one or more optical transceiver systems and is disposed between the optical fiber lines and optical transceivers so as to input and output optical signals, and is provided with the following: first optical switches (12a-12c) that output an optical signal input from an optical line to an optical transceiver; second optical switches (12d-12f) that output an optical signal input from an optical transceiver to an optical fiber line; and a local optical loopback circuit (13) that feeds back and outputs an optical signal input from an optical transceiver (21-23) to that optical transceiver.

6 Claims, 4 Drawing Sheets

(51) Int. Cl.
| | |
|---|---|
| *H04J 14/02* | (2006.01) |
| *H04Q 3/52* | (2006.01) |
| *H04B 10/25* | (2013.01) |
| *H04B 10/079* | (2013.01) |

(52) U.S. Cl.
CPC ............. *H04B 10/25* (2013.01); *H04J 14/00* (2013.01); *H04J 14/02* (2013.01); *H04J 14/0212* (2013.01); *H04J 14/0217* (2013.01); *H04Q 3/52* (2013.01); *H04Q 11/0003* (2013.01); *H04Q 2011/0015* (2013.01); *H04Q 2011/0016* (2013.01); *H04Q 2213/1301* (2013.01); *H04Q 2213/13295* (2013.01); *H04Q 2213/13367* (2013.01)

(58) Field of Classification Search
USPC .............................................. 398/45, 43, 59
See application file for complete search history.

(56) References Cited

U.S. PATENT DOCUMENTS

| | | | | |
|---|---|---|---|---|
| 2004/0240884 | A1* | 12/2004 | Gumaste | H04J 14/0204 398/59 |
| 2005/0025044 | A1* | 2/2005 | Pitio | H04J 3/085 370/220 |
| 2008/0131128 | A1* | 6/2008 | Ota | H04J 14/0201 398/79 |
| 2009/0290866 | A1 | 11/2009 | Chung et al. | |
| 2010/0150255 | A1* | 6/2010 | Konishi | H04J 3/0685 375/259 |
| 2011/0085803 | A1* | 4/2011 | Ji | H04J 14/0204 398/79 |
| 2011/0200324 | A1* | 8/2011 | Boertjes | H04J 14/0212 398/16 |
| 2011/0243558 | A1* | 10/2011 | Iizawa | H04J 14/0204 398/48 |
| 2011/0286746 | A1 | 11/2011 | Ji et al. | |
| 2012/0070154 | A1* | 3/2012 | Portier | H04B 10/035 398/136 |
| 2012/0224170 | A1* | 9/2012 | Hisamoto | H04B 10/077 356/73.1 |
| 2013/0136445 | A1* | 5/2013 | El-Ahmadi | H04B 10/07 398/22 |
| 2013/0259474 | A1* | 10/2013 | Ji | H04J 14/0212 398/48 |
| 2015/0215687 | A1* | 7/2015 | Aono | H04B 10/079 398/48 |

FOREIGN PATENT DOCUMENTS

| | | |
|---|---|---|
| JP | 2001-44936 A | 2/2001 |
| JP | 2001-268011 A | 9/2001 |
| JP | 2002-33703 A | 1/2002 |
| JP | 2003-258730 A | 9/2003 |
| TW | 200838174 A | 9/2008 |
| WO | 2011/133254 A2 | 10/2011 |

OTHER PUBLICATIONS

Communication dated Aug. 18, 2015 from the Japanese Patent Office in counterpart application No. 2014-528058.

Toshio Watanabe, et al., Compact PLC-based transponder aggregator for colorless and directionless ROADM, 2011 and the National Fiber Optic Engineers Conference Optical Fiber Communication Conference and Exposition (OFC/NFOEC), U.S.A., IEEE, Mar. 6, 2011, pp. 1-3.

International Search Report for PCT/JP2013/069016 dated Aug. 20, 2013.

Philip N. Ji et al., "colorless and Directionless Multi-Degree Reconfigurable Optical Add/Drop Multiplexers", 19$^{th}$ Annual Wireless and Optical Communications Conference (WOCC), May 15, 2010, pp. 1-5.

Kenichi Kitayama, "Technical Trend of Photonic Network", Sep. 9, 2011, SCAT LINE vol. 87, Photonic Internet Forum, (Support Center for Advanced Telecommunications Technology Research Foundation), <URL:http://www.scat.or.jp/scatline/scatline87/pdf/scat87_report01.pdf>.

"NEC Launches Network Failure Resistant, Non-Blocking Optical Cross-Connect Transmission Apparatus for 100 Gbit/s Transmission (Press Release)", Jun. 9, 2011, [searched on Jul. 9, 2012], NEC Corporation, Internet <URL:http://www.nec.co.jp/press/ja/1106/0802.html>.

Communication dated Mar. 25, 2016 from the State Intellectual Property Office of the P.R.C. issued in corresponding Application No. 201380040653.6.

Communication dated Sep. 29, 2016 from the Russian Patent Office in counterpart Application No. 2015106912/28.

* cited by examiner

FIG.1

WAVELENGTH MULTIPLEXER, AND METHOD AND PROGRAM FOR IDENTIFYING FAILED PORTION

CROSS REFERENCE TO RELATED APPLICATIONS

This application is a National Stage of International Application No. PCT/JP2013/069016 filed Jul. 11, 2013, claiming priority based on Japanese Patent Application No. 2012-169440 filed Jul. 31, 2012, the contents of all of which are incorporated herein by reference in their entirety.

TECHNICAL FIELD

The present invention relates to a wavelength multiplexer and to a method and a program for identifying a failed portion, and more particularly relates to a wavelength multiplexer and the like that can effectively identify a failed portion.

BACKGROUND ART

Photonic networks are networks that depend solely on optical techniques (without converting an optical signal into an electrical signal) to implement network functions such as transmission, multiplexing, demultiplexing, switching, and path control. Even before the rise of the photonic networks, optical fibers have been used for transmission paths and optical amplifiers have been used for amplifying a signal, but circuit switching has only been electrically achievable. More specifically, the optical signal has had to be converted into an electrical signal. Thus, a communication capacity in the network is limited by the performance of a switching apparatus.

The electrical switching involves extremely large power consumption in the apparatus, which increasingly rises with a higher communication speed and a larger number of systems of transmission paths that can be contained. To satisfy the demand for achieving both high speed communications and low power consumption growing by time, optical switching techniques achieving the switching by directly using the optical signal, without the need of the conversion into an electrical signal, have currently been under vigorous study and development.

Figure 4:
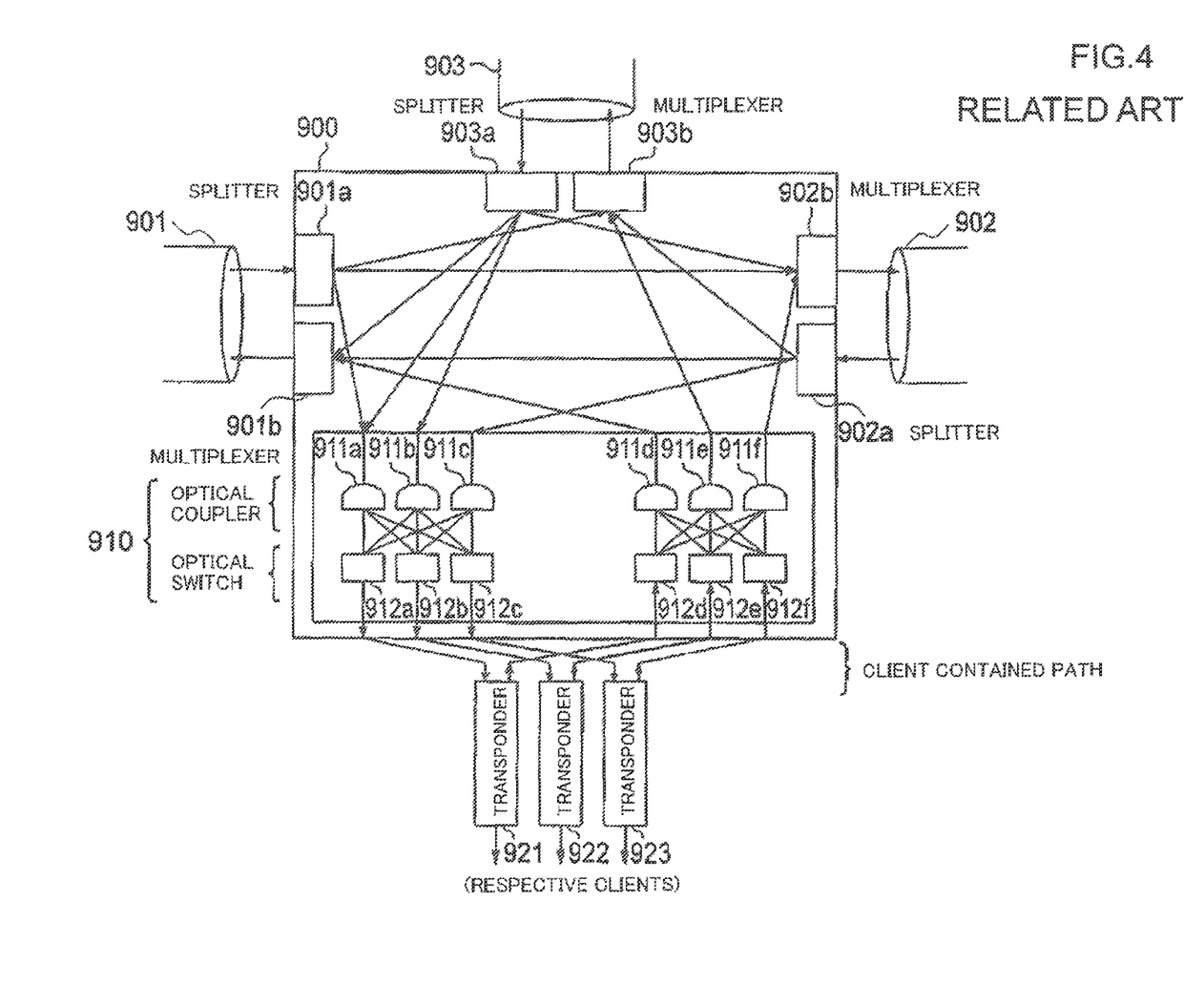
FIG. 4 is a diagram illustrating the configuration of a wavelength multiplexer according to a known optical switching technique.

FIG. 4 is a diagram illustrating the configuration of a wavelength multiplexer 900 (colorless/directionless/contentionless reconfigurable optical add/drop multiplexer (CDC ROADM)) according to a known optical switching technique. The wavelength multiplexer 900 is connected to WDM routes 901, 902, and 903 as a plurality of systems of optical fiber lines, and inputs and outputs an optical signal to and from each WDM route.

Each WDM route inputs and outputs a signal to and from the transponders 921, 922, and 923 through a split-and-select module 910. The transponders 921, 922, and 923 convert an electrical or optical signal transmitted from each client into an optical or electrical signal. Paths between the split-and-select module 910 and each of the transponders 921, 922, and 923 are referred to as a client contained path.

In FIG. 4, the three systems of WDM routes 901, 902, and 903 and the three systems of transponders 921, 922, and 923 are illustrated due to the limitation in the sheet size. Larger numbers of WDM routes and transponders may be connected to the actual wavelength multiplexer 900. Furthermore, the number of systems needs not to be the same between WDM routes and transponders.

The split-and-select module 910 includes: optical couplers 911 corresponding to optical signals transmitted and received by the WDM routes; and optical switches 912 corresponding to optical signals transmitted and received by the transponders. Each optical signal received from the WDM route 901 is split by a splitter 901a and each optical signal obtained by multiplexing in a multiplexer 901b is input to the WDM route 901. Similar splitters 902a and 903a and multiplexers 902b and 903b are respectively connected to the other WDM routes 902 and 903.

The optical signals output from the splitter 901a of the WDM route 901 are input to the optical coupler 911a, the multiplexer 902b of the WDM route 902, and the multiplexer 903b of the WDM route 903. Similarly, the optical signals output from the splitter 902a of the WDM route 902 are input to the optical coupler 911b, the multiplexer 901b of the WDM route 901, and the multiplexer 903b of the WDM route 903. The optical signals output from the splitter 903a of the WDM route 903 are input to the optical coupler 911c, the multiplexer 901b of the WDM route 901, and the multiplexer 902b of the WDM route 902.

The multiplexer 901b of the WDM route 901 multiplexes the signals output from the optical coupler 911d, the splitter 902a of the WDM route 902, and the splitter 903a of the WDM route 903, and outputs the resultant signal to the WDM route 901. Similarly, the multiplexer 902b of the WDM route 902 multiplexes the signals output from the optical coupler 911e, the splitter 901a of the WDM route 901, and the splitter 903a of the WDM route 903, and outputs the resultant signal to the WDM route 902. The multiplexer 903b of the WDM route 903 multiplexes the signals output from the optical coupler 911f, the splitter 901a of the WDM route 901, and the splitter 902a of the WDM route 902, and outputs the resultant signal to the WDM route 903.

The optical switches 912a to 912c each select one of the optical signals output from the multiplexers 901b to 903b of the WDM routes 901 to 903, and input the selected signal to the transponders 921 to 923. The optical switches 912d to 912f each select one of the splitters 901a to 903a of the WDM routes 901 to 903, and outputs the optical signal output from the transponders 921 to 923 to the selected destination.

When an optical signal output from the splitter 901a of the WDM route 901 is to be received by the transponder 921, the optical switch 912a may select the optical signal transmitted from the optical coupler 911a, so that a drop path will be established. When an optical signal is to be transmitted to the multiplexer 901b of the WDM route 901 by the transponder 921, the optical switch 912d may select the optical coupler 911d as the destination of the output optical signal, so that an add path will be established.

The inventors of the present invention have already put such a wavelength multiplexer 900 into market in 2011 (NPL 2) as an apparatus supporting 100 Gbit/s Ethernet (registered trademark), and the apparatus is currently under technical development to achieve higher speed and larger capacity.

Technical literatures related to the apparatus include: PTL 1 describing an optical node system that can achieve function enhancement and troubleshooting in a network at a low cost by using n×n optical switches; NPL 1 introducing recent trends in the photonic network described above; and NPL 2 describing the wavelength multiplexer supporting 100 Gbit/s Ethernet that has been put into market by the inventors as described above.

CITATION LIST

Patent Literature

[PTL 1]: Japanese Patent Application Publication No. 2001-268011

Non Patent Literature

[NPL 1]: Kenichi Kitayama, "Technical trend of Photonic Network", Sep. 9, 2011, [searched on Jul. 9, 2012], SCAT LINE Vol. 87, Photonic Internet Forum, (Support Center for Advanced Telecommunications Technology Research Foundation), Internet <URL:http://www.scat.or.jp/scatline/scatline87/pdf/scat87_report01.pdf>

[NPL 2]: "NEC Launches Network Failure Resistant, Non-Blocking Optical Cross-Connect Transmission Apparatus for 100 Gbit/s Transmission (Press Release)", Jun. 9, 2011, [searched on Jul. 9, 2012], NEC Corporation, Internet <URL:http://www.nec.co.jp/press/ja/1106/0802.html>

SUMMARY OF INVENTION

Technical Problem

Unfortunately, the wavelength multiplexer 900 requires a cumbersome operation, involving a large amount of time and labor, when any of the transmission systems fail. Specifically, the optical cable needs to be connected/disconnected and the transmission system needs to be switched manually to identify whether the failure has occurred at a portion before or after the split-and-select module 910.

The technique disclosed in PTL 1 is for maintaining communications upon occurrence of a failure by avoiding the failure and is not for identifying the failed portion. Neither NPL 1 nor NPL 2 discloses a technique that could solve the problem described above.

An object of the present invention is to provide a wavelength multiplexer, and a method and a program for identifying a failed portion that can effectively identify whether a failed portion is before or after a split-and-select module.

Solution to Problem

To achieve the object, a wavelength multiplexer according to the present invention is a wavelength multiplexer that is connected with and provided between a plurality of systems or a single system of optical fiber lines and a plurality of systems or a single system of optical transponders, and inputs and outputs an optical signal to and from the optical fiber lines and the optical transponders. The wavelength multiplexer includes: first optical switches that output an optical signal input from the optical fiber lines to the optical transponders; second optical switches that output an optical signal input from the optical transponders to the optical fiber lines; and a local optical loopback circuit that loops back and outputs an optical signal input from any of the optical transponders to the side of that optical transponder.

To achieve the object, a method for identifying a failed portion according to the present invention is a method for identifying a failed portion executed by a module inspection unit included in a split-and-select module included in a wavelength multiplexer. The split-and-select module is connected with a plurality of systems of optical fiber lines and optical transponders and inputs and outputs an optical signal to and from the optical fiber lines and the optical transponders. The split-and-select module includes: a local optical loopback circuit that loops back and outputs an optical signal input from any of the optical transponders to the side of that optical transponder; first optical switches that selectively output the optical signal received from the optical fiber lines or the optical signal looped back by the local optical loopback circuit to the optical transponders by an external switching operation; second optical switches that selectively output the optical signal received from the optical transponders to one system of the optical fiber lines or the local optical loopback circuit by an external switching operation; and the module inspection unit that operates in accordance with an external operational instruction. The method includes: controlling switching of the first optical switches so as to output the optical signal looped back by the local optical loopback circuit to the optical transponders; at the same time, controlling switching of the second optical switches so as to output the optical signal received from the optical transponders to the local optical loopback circuit; and then causing the optical transponders to operate and emit the optical signal and determining whether the optical transponders have received the optical signal looped back by the local optical loopback circuit.

To achieve the object, a program for identifying a failed portion according to the present invention is a program for identifying a failed portion containing processes executed by a processor included in a module inspection unit included in a split-and-select module included in a wavelength multiplexer. The split-and-select module is connected with a plurality of systems of optical fiber lines and optical transponders and inputs and outputs an optical signal to and from the optical fiber lines and the optical transponders. The split-and-select module includes: a local optical loopback circuit that loops back and outputs an optical signal input from any of the optical transponders to the side of that optical transponder; first optical switches that selectively output the optical signal received from the optical fiber lines or the optical signal looped back by the local optical loopback circuit to the optical transponders by an external switching operation; second optical switches that selectively output the optical signal received from the optical transponders to one system of the optical fiber lines or the local optical loopback circuit by an external switching operation; and the module inspection unit that operates in accordance with an external operational instruction. The processes include: switching of the first optical switches so as to output the optical signal looped back by the local optical loopback circuit to the optical transponders; at the same time, switching of the second optical switches so as to output the optical signal received from the optical transponders to the local optical loopback circuit; and then causing the optical transponders to operate and emit the optical signal and determining whether the optical transponders have received the optical signal looped back by the local optical loopback circuit.

Advantageous Effects of Invention

The present invention can provide a wavelength multiplexer and a method and a program for identifying a failed portion which has an excellent feature that can effectively identify whether a failed portion is before or after the split-and-select module, with the configuration including a local optical loopback circuit that loops back and outputs an optical signal input from any of the optical transponders to the side of that optical transponder as described above.

DESCRIPTION OF EMBODIMENTS (First Exemplary Embodiment)

A first exemplary embodiment of the present invention is described below with reference to FIG. 1.

The basic configuration of the present exemplary embodiment is described, and then the detailed configuration will be described.

A wavelength multiplexer 100 according to the present exemplary embodiment is a wavelength multiplexer that is connected with a plurality of systems of optical fiber lines (WDM routes 101 to 103) and optical transponders (transponders 21 to 23), and inputs and outputs an optical signal to and from the optical fiber lines and the optical transponders. The wavelength multiplexer 100 includes: first optical switches 12a to 12c that output an optical signal input from the optical fiber lines to the optical transponders; second optical switches 12d to 12f that output an optical signal input from the optical transponders to the optical fiber lines; and a local optical loopback circuit 13 that loops back and outputs an optical signal input from any of the optical transponders to the side of that optical transponder.

The first optical switches 12a to 12c selectively output the optical signal received from the optical fiber lines or the optical signal looped back by the local optical loopback circuit to the optical transponders by an external switching operation. The second optical switches 12d to 12f selectively output the optical signal received from the optical transponders to one system of the optical fiber lines or the local optical loopback circuit by an external switching operation.

The wavelength multiplexer 100 further includes: optical couplers 11a to 11c that each branch an optical signal received from a corresponding one of the optical fiber lines and output the resultant signal to each optical transponder, and second optical couplers 11d to 11f that each multiplex an optical signal received from a corresponding one of the optical transponders and output the resultant signal to each optical fiber line.

The wavelength multiplexer 100 includes a module inspection unit 40 that, in accordance with an external operational instruction, switches the first optical switches so as to output the optical signal looped back by the local optical loopback circuit to the optical transponders; at the same time, switches the second optical switches so as to output the optical signal received from the optical transponders to the local optical loopback circuit; and then causes the optical transponders to emit the optical signal and determines whether the optical transponders have received the optical signal looped back by the local optical loopback circuit.

With this configuration, the wavelength multiplexer 100 can effectively identify whether a failed portion is before or after a split-and-select module 10.

The following describes the configuration in greater detail.

Figure 1:
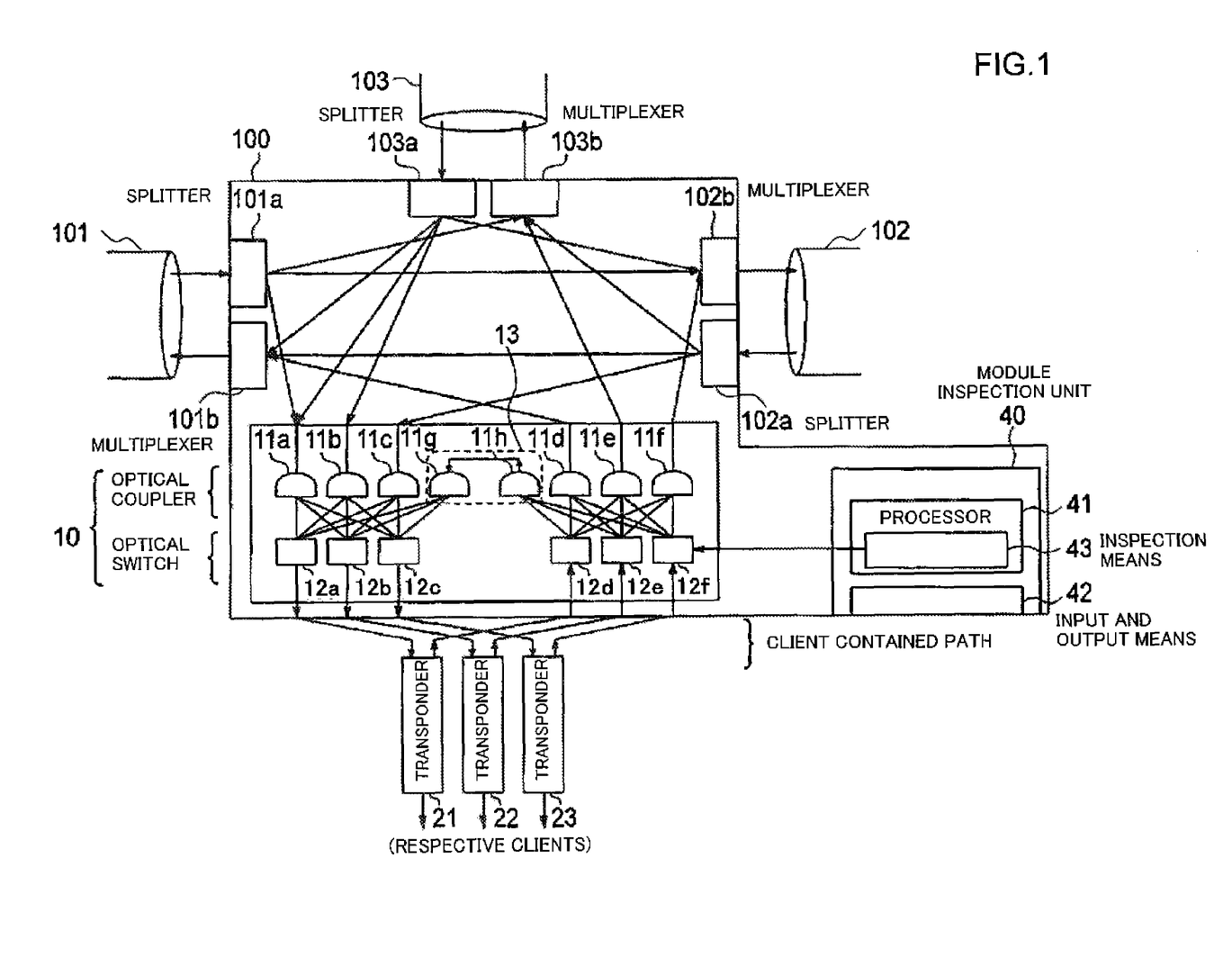
FIG. 1 is a diagram illustrating the configuration of a wavelength multiplexer according to a first exemplary embodiment of the present invention.

FIG. 1 is a diagram illustrating the configuration of the wavelength multiplexer 100 (colorless/directionless/contentionless reconfigurable optical add/drop multiplexer, CDC ROADM) according to the first exemplary embodiment of the present invention. The wavelength multiplexer 100 is connected to the WDM routes 101, 102, and 103 as a plurality of systems of optical fiber lines, and inputs and outputs an optical signal to and from each WDM route.

Each WDM route inputs and outputs a signal to and from the transponders 21, 22, and 23 through the split-and-select module 10. The transponders 21, 22, and 23 convert an electrical or optical signal transmitted from each client into an optical or electrical signal. Paths between the split-and-select module 10 and each of the transponders 21, 22, and 23 are referred to as a client contained path.

In FIG. 1, the three systems of WDM routes 101, 102, and 103 and the three systems of transponders 21, 22, and 23 are illustrated due to the limitation in the sheet size. Larger numbers of WDM routes and transponders may be connected to the actual wavelength multiplexer 100. Furthermore, the number of systems needs not to be the same between WDM routes and transponders.

The split-and-select module 10 includes: the optical couplers 11 that deal with optical signals transmitted and received by the WDM routes; and the optical switches 12 that deals with optical signals transmitted and received by the transponders. Each optical signal received from the WDM route 101 is split by a splitter 101a and each optical signal obtained by multiplexing in a multiplexer 101b is input to the WDM route 101. Similar splitters 102a and 103a and multiplexers 102b and 103b are respectively connected to the other WDM routes 102 and 903.

The optical signals output from the splitter 101a of the WDM route 101 are input to the optical coupler 11a, the multiplexer 102b of the WDM route 102, and the multiplexer 103b of the WDM route 103. Similarly, the optical signals output from the splitter 102a of the WDM route 102 are input to the optical coupler 11b, the multiplexer 101b of the WDM route 101, and the multiplexer 103b of the WDM route 103. The optical signals output from the splitter 103a of the WDM route 103 are input to the optical coupler 11c, the multiplexer 101b of the WDM route 101, and the multiplexer 102b of the WDM route 102.

The multiplexer 101b of the WDM route 101 multiplexes the signals output from the optical coupler 11d, the splitter 102a of the WDM route 102, and the splitter 103a of the WDM route 103, and outputs the resultant signal to the WDM route 101. Similarly, the multiplexer 102b of the WDM route 102 multiplexes the signals output from the optical coupler 11e, the splitter 101a of the WDM route 101, and the splitter 103a of the WDM route 103, and outputs the resultant signal to the WDM route 102. The multiplexer 103b of the WDM route 103 multiplexes the signals output from the optical coupler 11f, the splitter 101a of the WDM route 101, and the splitter 102a of the WDM route 102, and outputs the resultant signal to the WDM route 103.

The configuration described above is the same as the wavelength multiplexer 900 according to the known technique described above. The split-and-select module 10 included in the wavelength multiplexer 100 according to the present exemplary embodiment further includes two optical couplers 11g and 11h. The optical signals output from the optical coupler 11h are directly input to the optical coupler 11g. Thus, the optical couplers 11g and 11h are also collectively referred to as a local optical loopback circuit 13.

The optical switches 12a to 12c each select one of the optical signals output from the splitters 101b to 103b of the WDM routes 101 to 103 and the optical coupler 11g, and input the selected signal to the transponders 21 to 23. The optical switches 12d to 12f each select one of the multiplexers 101a to 103a of the WDM routes 101 to 103 and the optical coupler 11h, and outputs the optical signal output from the transponders 21 to 23 to the selected destination.

A module inspection unit 40 is a microcomputer or a stand-alone computer device that includes a processor 41 that mainly executes a computer program, and is connected to the split-and-select module 10. When a user instructs the module inspection unit 40 to perform inspection through an input and output means 42, the processor 41 starts an inspection program to function as an inspection means 43. The module inspection unit 40 further includes a storage means, a communication means, and the like that are not particularly required for describing the present invention and thus will not be described in detail.

The inspection means 43 emits a control signal for instructing the optical switches 12a to 12f to switch optical signals. The inspection means 43 also emits a control signal for instructing the transponders 21 to 23 to output light to receive information indicating the strength, the wavelength, and the like of the input optical signal from the transponders 21 to 23.

Figure 2:
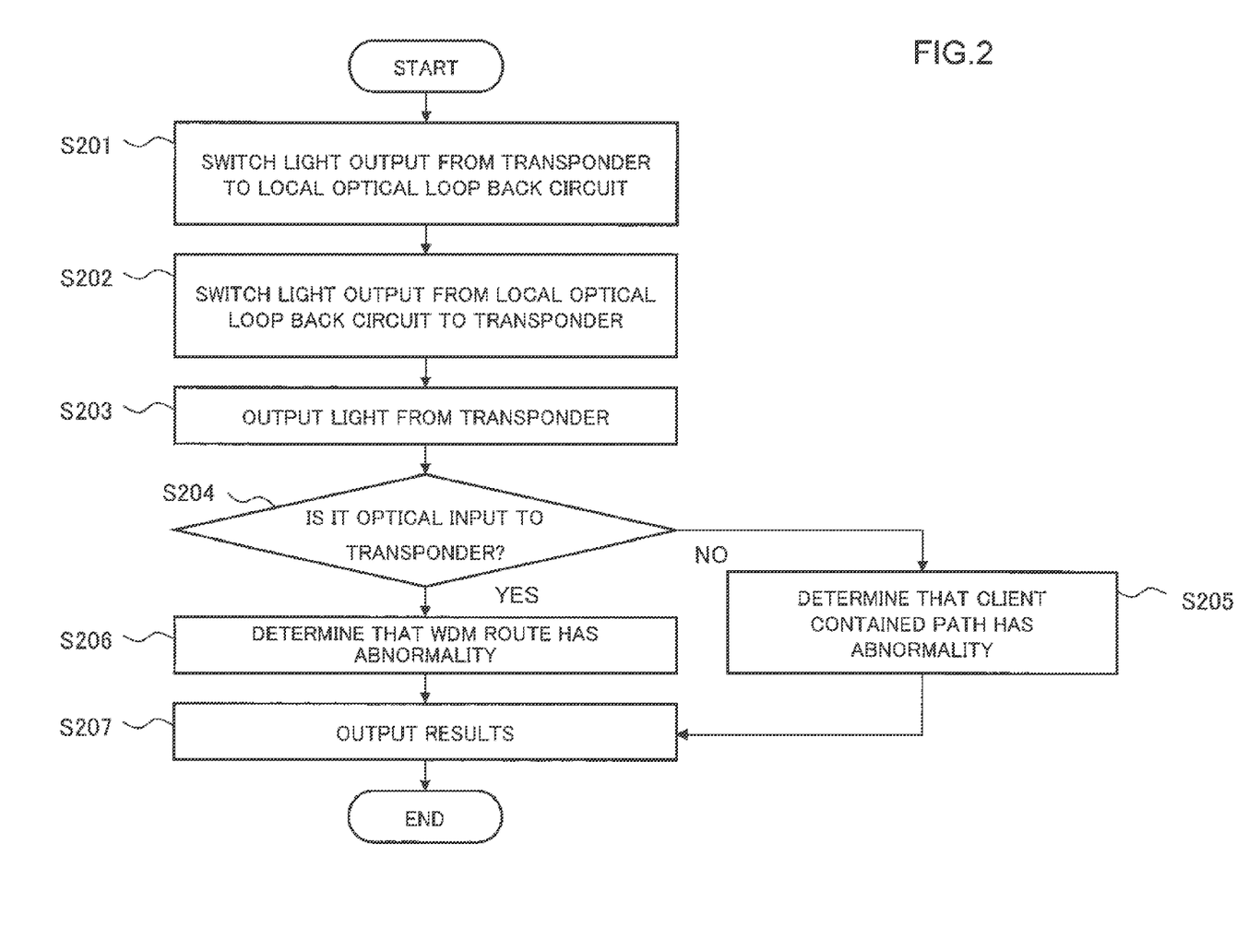
FIG. 2 is a flowchart illustrating processing for identifying whether a failed portion is before or after a split-and-select module in the wavelength multiplexer illustrated in FIG. 1.

FIG. 2 is a flowchart illustrating processing for identifying whether a failed portion is before or after the split-and-select module 10 in the wavelength multiplexer 100 illustrated in FIG. 1. The inspection means 43 that has started the processing first switches among the optical switches 12d to 12f so that the switch, corresponding to one of the transponders 21 to 23 as the inspection target, outputs the optical signals output from the target transponder to the optical coupler 11h (the local optical loop back circuit 13) (step S201).

In response to this process, the inspection means 43 switches between the optical switches 12a to 12c so that the optical signals output from the optical coupler 11g (the local optical loop back circuit 13) return to the input side of the inspection target in the transponders 21 to 23 as the inspection target (step S202). With these processes, a local side loopback for the transponder as the inspection target is established.

The inspection means 43 then causes the inspection target in the transponders 21 to 23 to output light (step S203), and thus determines whether the optical signal returned through the local optical loopback circuit 13 is input to the inspection target in the transponders 21 to 23 (step S204).

When the optical signal is failed to be input, the client contained path before the split-and-select module 10 can be determined to have an abnormality (step S205). When the optical signal is successfully input, the WDM routes 101 to 103 after the split-and-select module 10 can be determined to have an abnormality (step S206). Either of the determination results is presented to the user through the input and output means 42 (step S207), and thus the processing performed by the inspection means 43 is terminated.

For example, whether the client contained path is appropriately connected between the split-and-select module 10 and the transponder 21 can be checked as follows. Specifically, the inspection means 43 performs the switching in step S201 in such a manner that the optical switch 12d outputs the optical signal, output from the transponder 21, to the optical coupler 11h. This output optical signal returns to the optical coupler 11g, and thus the inspection means 43 performs the switching in step S202 in such a manner that the optical switch 12a inputs this optical signal output from the optical coupler 11g to the transponder 21.

Thus, if the client contained path between the split-and-select module 10 and the transponder 21 has an abnormality, the output optical signal does not return to the input side due to the incomplete optical loopback. Thus, it is apparent that the client contained path has the abnormality. The client contained paths between the other transponders 22 and 23 and the split-and-select module 10 can be checked in a similar manner to see whether there is an abnormality.

Overall Processing in First Exemplary Embodiment

Next, the overall processing in the exemplary embodiment mentioned above will be described.

A method for identifying a failed portion according to the exemplary embodiment is executed by the module inspection unit 40 included in the split-and-select module 10 included in the wavelength multiplexer 100. The split-and-select module 10 is connected with a plurality of systems of optical fiber lines and optical transponders and inputs and outputs an optical signal to and from the optical fiber lines and the optical transponders. The split-and-select module 10 includes: the local optical loopback circuit 13 that loops back and outputs an optical signal input from any of the optical transponders to the side of that optical transponder; the first optical switches 12a to 12c that selectively output the optical signal received from the optical fiber lines or the optical signal looped back by the local optical loopback circuit to the optical transponders by an external switching operation; the second optical switches 12d to 12f that selectively output the optical signal received from the optical transponders to one system of the optical fiber lines or the local optical loopback circuit by an external switching operation; and the module inspection unit 40 that operates in accordance with an external operational instruction. The method includes: controlling switching of the first optical switches so as to output the optical signal looped back by the local optical loopback circuit to the optical transponders (step S201 in FIG. 2); at the same time, controlling switching of the second optical switches so as to output the optical signal received from the optical transponders to the local optical loopback circuit (step S202 in FIG. 2); then causing the optical transponders to operate and emit the optical signal (step S203 in FIG. 2); and determining whether the optical transponders have received the optical signal looped back by the local optical loopback circuit (step S204 in FIG. 2).

The above-described operational steps may be provided in a computer-executable program, so that the program can be executed by the processor 41 in the module inspection unit 40, which directly executes the above-described steps. The program may be recorded in a non-transitory recording medium, such as a DVD, a CD, and a flash memory. In this case, the program is read from the recording medium and executed by the computer.

Through this operation, the present exemplary embodiment has the following advantageous effects.

In the present exemplary embodiment, when a failure occurs in the wavelength multiplexer, whether the failed portion is before or after the split-and-select module can be surely and easily be identified. None of the cumbersome operation such as the manual disconnection/connection of an optical cable and transmission system switching, nor a special measurement device is required in the process. All it requires is to issue a simple instruction to execute an inspection to the module inspection unit 40, and the module inspection unit 40 will execute the inspection.

The module inspection unit 40 may necessarily be in direct connection with the wavelength multiplexer 100, and may remotely operate the wavelength multiplexer 100 through a network and the like. When maintenance can be performed through the remote operation, the labor and cost required for the maintenance can be largely reduced.

The local optical loopback circuit may not necessarily be provided for each system of the transponders 21 to 23. A single system of the local optical loopback circuit in the wavelength multiplexer 100 as a whole may be shared among all the systems. This configuration can largely reduce the cost for the multiplexer, and contribute to downsizing and cost reduction.

(Second Exemplary Embodiment)

Figure 3:
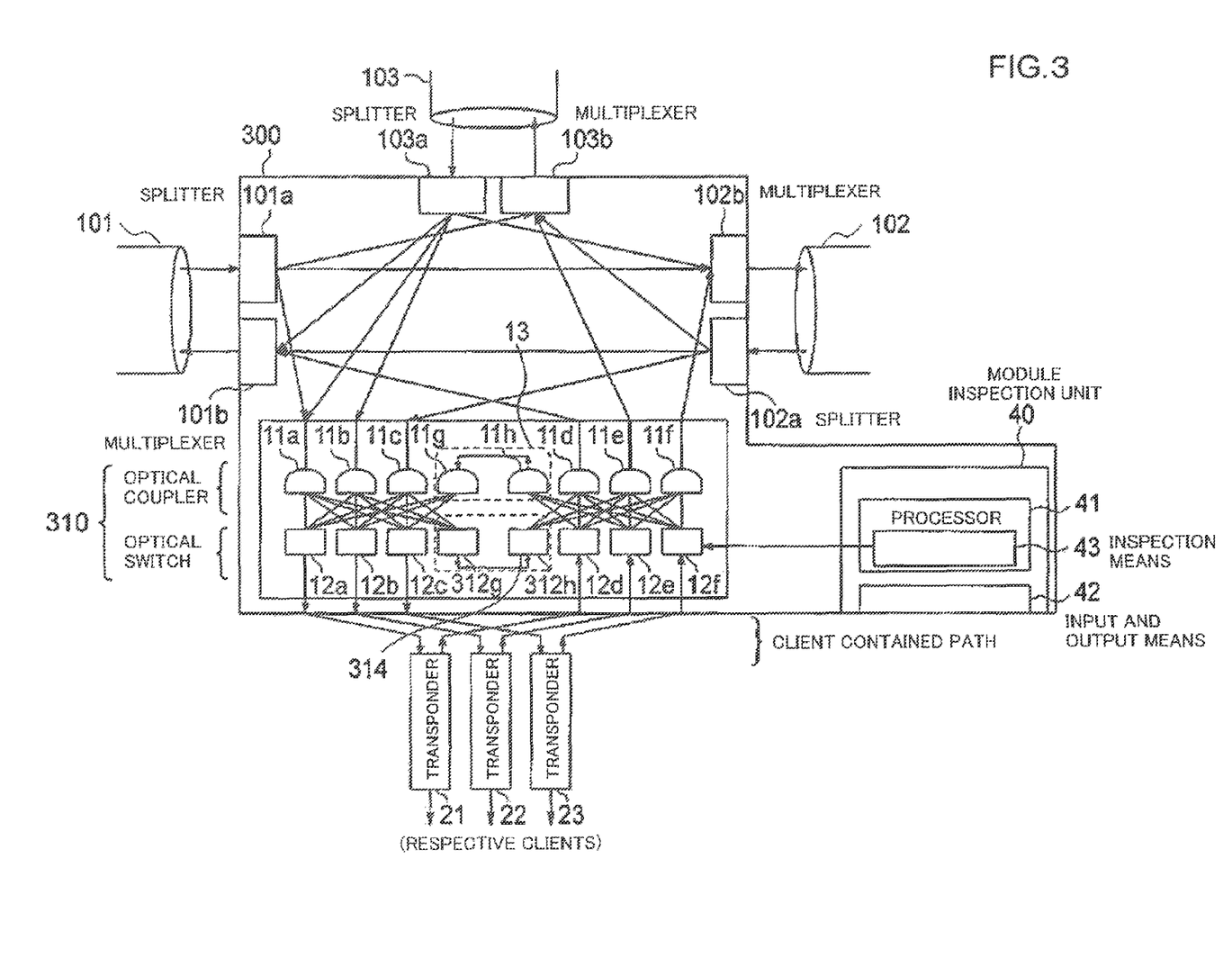
FIG. 3 is a diagram illustrating the configuration of a wavelength multiplexer according to a second exemplary embodiment of the present invention.

A wavelength multiplexer 300 according to a second exemplary embodiment of the present invention includes, in addition to the configuration described in the first exemplary embodiment, a remote optical loopback circuit 314 that loops back and outputs an optical signal input from any of the optical fiber line to the side of that optical fiber line. In addition, the optical switches 11a to 11c selectively output the optical signal received from the optical fiber lines or the optical signal looped back by the local optical loopback circuit to the optical transponders or the remote optical loopback circuit by an external switching operation. The second optical switches 11d to 11f selectively output the optical signal received from the optical transponders or the remote optical loopback circuit to any one system of the plurality of systems of the optical fiber lines or the local optical loopback circuit by an external switching operation.

As well as providing the same advantageous effects as in the first exemplary embodiment, this configuration can detect an abnormality in an apparatus on the other side connected to the wavelength multiplexer 300 through the optical fiber line. In this case, there is no need to change the configuration of the apparatus on the other side.

The following describes this configuration in greater detail.

FIG. 3 is a diagram illustrating the configuration of the wavelength multiplexer 300 according to the second exemplary embodiment of the present invention. Since the wavelength multiplexer 300 mainly includes the same configuration as that of the wavelength multiplexer 100 according to the first exemplary embodiment described above, like elements are denoted with like names and reference signs, and these descriptions will be omitted.

A split-and-select module 310 included in the wavelength multiplexer 300 further includes, in addition to the configuration described in the first exemplary embodiment, two optical switches 312g and 312h. The optical signals output from the optical switches 312g are directly input to the optical switches 312h. Thus, the optical switches 312g and 312h are also collectively referred to as a remote optical loopback circuit 314.

For example, whether the WDM route 101 after the split-and-select module 310 is appropriately connected can be checked by using above remote optical loopback circuit as follows. Specifically, the optical switch 312g performs switching so that the optical signal output from the optical coupler 11a is output to the optical switch 312h. Then, the optical switch 312h performs switching so that the optical signal is output to the optical coupler 11d.

Thus, if the WDM route 101 after the split-and-select module 310 is under failure, the abnormality can be detected in an apparatus on the other side connected to the wavelength multiplexer 300 through the WDM route 101. Thus, it is apparent that the WDM route 101 has the abnormality. The other WDM routes 102 and 103 can be checked in a similar manner to see whether there is an abnormality. Here, the apparatus on the other side may not have a configuration similar to that in the present embodiment.

The present invention has been described with reference to specific exemplary embodiments illustrated in the accompanying drawings, but the present invention is not limited to the exemplary embodiments illustrated in the drawings. Any known configuration can be adopted as long as it provides the advantageous effects of the present invention.

The following describes the overview of the novel technical features of the above-described exemplary embodiments. While the exemplary embodiments can be partially or entirely summarized as a novel technique as described below, the present invention is not necessarily limited to this.

(Supplementary Note 1) A wavelength multiplexer connected with and provided between a plurality of systems or a single system of optical fiber lines and a plurality of systems or a single system of optical transponders, and inputting and outputting an optical signal to and from the optical fiber lines and the optical transponders, the wavelength multiplexer including:

first optical switches that output an optical signal input from the optical fiber lines to the optical transponders;

second optical switches that output an optical signal input from the optical transponders to the optical fiber lines; and a local optical loopback circuit that loops back and outputs an optical signal input from any of the optical transponders to the side of that optical transponder.

(Supplementary Note 2) The wavelength multiplexer according to Supplementary Note 1, in which the first optical switches have a function of selectively outputting the optical signal received from the optical fiber lines or the optical signal looped back by the local optical loopback circuit to the optical transponders by an external switching operation, and the second optical switches have a function of selectively outputting the optical signal received from the optical transponders to one system of the optical fiber lines or the local optical loopback circuit by an external switching operation.

(Supplementary Note 3) The wavelength multiplexer according to Supplementary Note 2, further including: first optical couplers that each branch an optical signal received from a corresponding one of the optical fiber lines and output the resultant signal to each first optical switch; and second optical couplers that each multiplex an optical signal received from a corresponding one of the second optical switches and output the resultant signal to each optical fiber line.

(Supplementary Note 4) The wavelength multiplexer according to Supplementary Note 2, further including a module inspection unit that operates in accordance with an external operational instruction, in which the module inspection unit has a function of controlling switching of the first optical switches so as to output the optical signal looped back by the local optical loopback circuit to the optical transponders, the module inspection unit has a function of, at the same time, controlling switching of the second optical switches so as to output the optical signal received from the optical transponders to the local optical loopback circuit, and the module inspection unit has a function of then causing the optical transponders to emit the optical signal and determining whether the optical transponders have received the optical signal looped back by the local optical loopback circuit.

(Supplementary Note 5) The wavelength multiplexer according to Supplementary Note 2, further including a remote optical loopback circuit that loops back and outputs an optical signal input from any of the optical fiber lines to the side of that optical fiber line, in which the first optical switches have a function of selectively outputting the optical signal received from the optical fiber lines or the optical signal looped back by the local optical loopback circuit to the optical transponders or the remote optical loopback circuit by an external switching operation, and the second optical switches have a function of selectively outputting the optical signal received from the optical transponders or the remote optical loopback circuit to any one system of the optical fiber lines or the local optical loopback circuit by an external switching operation.

(Supplementary Note 6) A method for identifying a failed portion executed by a module inspection unit included in a split-and-select module included in a wavelength multiplexer, the split-and-select module being connected with a plurality of systems of optical fiber lines and optical transponders, and inputting and outputting an optical signal to and from the optical fiber lines and the optical transponders, the split-and-select module including: a local optical loopback circuit that loops back and outputs an optical signal input from any of the optical transponders to the side of that optical transponder; first optical switches that selectively output the optical signal received from the optical fiber lines or the optical signal looped back by the local optical loopback circuit to the optical transponders by an external switching operation; second optical switches that selectively output the optical signal received from the optical transponders to one system of the optical fiber lines or the local optical loopback circuit by an external switching operation; and the module inspection unit that operates in accordance with an external operational instruction, the method including:

controlling switching of the first optical switches so as to output the optical signal looped back by the local optical loopback circuit to the optical transponders;

at the same time, controlling switching of the second optical switches so as to output the optical signal received from the optical transponders to the local optical loopback circuit; and then causing the optical transponders to operate and emit the optical signal and determining whether the optical transponders have received the optical signal looped back by the local optical loopback circuit.

(Supplementary Note 7) A program for identifying a failed portion containing processes executed by a processor included in a module inspection unit included in a split-and-select module included in a wavelength multiplexer, the split-and-select module being connected with a plurality of systems of optical fiber lines and optical transponders, and inputting and outputting an optical signal to and from the optical fiber lines and the optical transponders, the split-and-select module including: a local optical loopback circuit that loops back and outputs an optical signal input from any of the optical transponders to the side of that optical transponder; first optical switches that selectively output the optical signal received from the optical fiber lines or the optical signal looped back by the local optical loopback circuit to the optical transponders by an external switching operation; second optical switches that selectively output the optical signal received from the optical transponders to one system of the optical fiber lines or the local optical loopback circuit by an external switching operation; and the module inspection unit that operates in accordance with an external operational instruction, the processes including:

switching of the first optical switches so as to output the optical signal looped back by the local optical loopback circuit to the optical transponders;

at the same time, switching of the second optical switches so as to output the optical signal received from the optical transponders to the local optical loopback circuit; and then causing the optical transponders to operate and emit the optical signal and determining whether the optical transponders have received the optical signal looped back by the local optical loopback circuit.

The present application claims priority based on Japanese Patent Application No. 2012-169440 filed on Jul. 31, 2012, the entirety of which is incorporated herein by reference.

INDUSTRIAL APPLICABILITY

The present invention is suitably applied to wavelength multiplexers, and more particularly to a reconfigurable optical add/drop multiplexer (ROADM).

REFERENCE SIGNS LIST 10, 310 split-and-select module
11$a$ to 11$h$ optical coupler
12$a$ to 12$f$, 312$g$ to 312$h$ optical switch
13 local optical loopback circuit
21, 22, 23 transponder
40 module inspection unit
41 processor
42 input and output means
43 inspection means
100, 300 wavelength multiplexer
101, 102, 103 WDM route
101$a$, 102$a$, 103$a$ splitter
101$b$, 102$b$, 103$b$ multiplexer
314 remote optical loopback circuit

The invention claimed is:

1. A wavelength multiplexer connected with and provided between a plurality of systems or a single system of optical fiber lines and a plurality of systems or a single system of optical transponders, and inputting and outputting an optical signal to and from the optical fiber lines and the optical transponders, the wavelength multiplexer comprising:

a first optical switch that outputs an optical signal input from the optical fiber lines to the optical transponders;

a second optical switch that outputs an optical signal input from the optical transponders to the optical fiber lines; and a local optical loopback circuit that loops back and outputs an optical signal input from any of the optical transponders to the side of that optical transponder, wherein the first optical switch has a function of outputting the optical signal received from the optical fiber lines to at least one of the optical transponders selected by an external switching operation simultaneously with outputting the optical signal looped back by the local optical loopback circuit to at least one of the optical transponders being not selected, and the second optical switch has a function of selectively outputting the optical signal received from the optical transponder selected from the optical transponders to one system of the optical fiber lines or the local optical loopback circuit by an external switching operation.

2. The wavelength multiplexer according to claim 1, wherein the first optical switch is one of a plurality of first optical switches,
the second optical switch is one of a plurality of second optical switches, and
the wavelength multiplexer further comprises:
first optical couplers that each branch an optical signal received from a corresponding one of the optical fiber lines and output the resultant signal to each first optical switch; and
second optical couplers that each multiplex an optical signal received from a corresponding one of the second optical switch and output the resultant signal to each optical fiber line.

3. The wavelength multiplexer according to claim 1, further including a module inspection unit that operates in accordance with an external operational instruction, wherein
the module inspection unit has a function of controlling switching of the first optical switch so as to output the optical signal looped back by the local optical loopback circuit to the optical transponders,
the module inspection unit has a function of, at the same time, controlling switching of the second optical switch so as to output the optical signal received from the optical transponders to the local optical loopback circuit, and
the module inspection unit has a function of then causing the optical transponders to emit the optical signal and determining whether the optical transponders have received the optical signal looped back by the local optical loopback circuit.

4. The wavelength multiplexer according to claim 1, further comprising a remote optical loopback circuit that loops back and outputs an optical signal input from any of the optical fiber lines to the side of that optical fiber line, wherein
the first optical switch has a function of selectively outputting the optical signal received from the optical fiber lines or the optical signal looped back by the local optical loopback circuit to the optical transponders or the remote optical loopback circuit by an external switching operation, and
the second optical switch has a function of selectively outputting the optical signal received from the optical transponders or the remote optical loopback circuit to any one system of the optical fiber lines or the local optical loopback circuit by an external switching operation.

5. A method for identifying a failed portion executed by a module inspection unit included in a split-and-select module included in a wavelength multiplexer, the split-and-select module being connected with a plurality of systems of optical fiber lines and optical transponders and inputting and outputting an optical signal to and from the optical fiber lines and the optical transponders,
the split-and-select module comprising: a local optical loopback circuit that loops back and outputs an optical signal input from any of the optical transponders to the side of the optical transponders; first optical switches that output the optical signal received from the optical fiber lines to at least one of the optical transponders selected by an external switching operation simultaneously with outputting the optical signal looped back by the local optical loopback circuit to at least one of the optical transponders being not selected; second optical switches that selectively output the optical signal received from the optical transponder selected from the optical transponders to one system of the optical fiber lines or the local optical loopback circuit by an external switching operation; and the module inspection unit that operates in accordance with an external operational instruction, the method comprising:
controlling switching of the first optical switches so as to output the optical signal looped back by the local optical loopback circuit to the optical transponder;
at the same time, controlling switching of the second optical switches so as to output the optical signal received from the optical transponder to the local optical loopback circuit; and
then causing the optical transponder to operate and emit the optical signal and determining whether the optical transponder has received the optical signal looped back by the local optical loopback circuit.

6. A wavelength multiplexer connected with and provided between a plurality of systems or a single system of optical fiber lines and a plurality of systems or a single system of optical transponders, and inputting and outputting an optical signal to and from the optical fiber lines and the optical transponders, the wavelength multiplexer comprising:
first optical switching means for outputting an optical signal input from the optical fiber lines to the optical transponders;
second optical switching means for outputting an optical signal input from the optical transponders to the optical fiber lines; and
local optical loopback means for looping back and outputting an optical signal input from any of the optical transponders to the side of that optical transponder,
wherein the first optical switching means has a function of outputting the optical signal received from the optical fiber lines to at least one of the optical transponders selected by an external switching operation simultaneously with outputting the optical signal looped back by the local optical loopback circuit to at least one of the optical transponders being not selected, and
the second optical switch has a function of selectively outputting the optical signal received from the optical transponder selected from the optical transponders to one system of the optical fiber lines or the local optical loopback circuit by an external switching operation.

* * * * *

UNITED STATES PATENT AND TRADEMARK OFFICE
CERTIFICATE OF CORRECTION

PATENT NO. : 9,654,850 B2
APPLICATION NO. : 14/414156
DATED : May 16, 2017
INVENTOR(S) : Yoshiaki Aono Page 1 of 1

It is certified that error appears in the above-identified patent and that said Letters Patent is hereby corrected as shown below:

In the Specification

Column 7, Line 8:
"101b to 103b" has been replaced with --101a to 103a--

Column 7, Line 12:
"101a to 103a" has been replaced with --101b to 103b--

Column 9, Line 26:
"11a to 11c" has been replaced with --12a to 12c--

Column 9, Line 31:
"11d to 11f" has been replaced with --12d to 12f--

Signed and Sealed this
Sixth Day of March, 2018

Andrei Iancu
*Director of the United States Patent and Trademark Office*